UNITED STATES PATENT OFFICE.

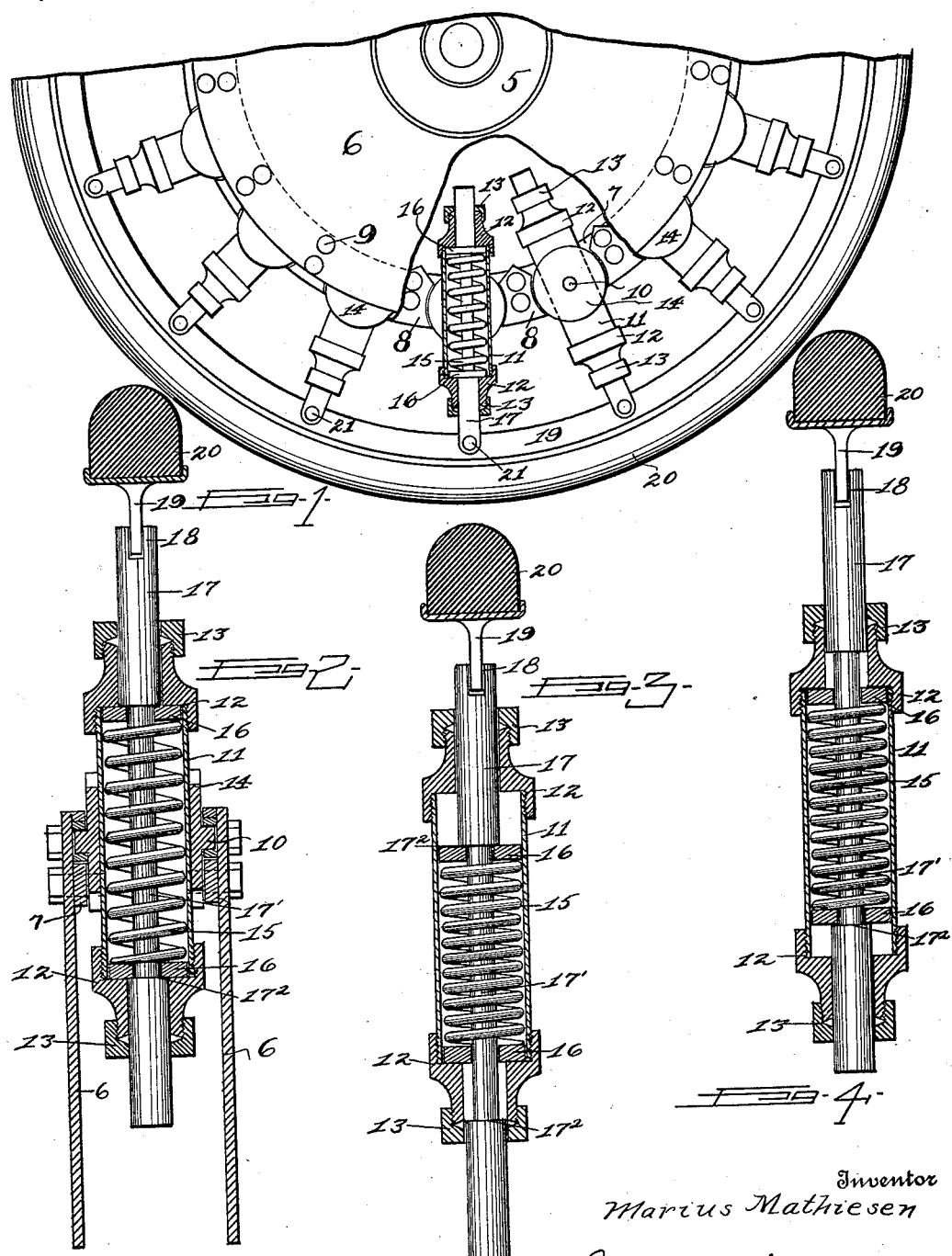

MARIUS MATHIESEN, OF SAN ANTONIO, TEXAS.

SPRING-WHEEL.

1,052,681.

Specification of Letters Patent.

Patented Feb. 11, 1913.

Application filed April 30, 1912. Serial No. 694,075.

*To all whom it may concern:*

Be it known that I, MARIUS MATHIESEN, a citizen of the United States, residing at San Antonio, in the State of Texas, have invented certain new and useful Improvements in Spring-Wheels, of which the following is a specification.

This invention relates to vehicle wheels, and more particularly to spring wheels, the object of the invention being to provide an improved device of this character adapted to efficiently absorb the shocks incident to the passage of the wheel over an uneven road bed, without the employment of pneumatic tires.

Further objects and advantages of the invention will be set forth in the detailed description which now follows.

In the accompanying drawing Figure 1 is a view partly in side elevation and partly in section, of a wheel constructed in accordance with the invention. Fig. 2 is a sectional view through one of the spring supporting members or spokes, with the parts in their intermediate position. Fig. 3 is a view corresponding to Fig. 2, with the springs compressed in one direction, and Fig. 4 is a like view with the spring compressed in the other direction.

Like numerals designate corresponding parts in all of the figures of the drawing.

Referring to the drawing, the numeral 5 designates a hub, said hub carrying a pair of steel disks or plates 6, which form a casing. These disks carry annular bands 7, and are spaced apart by blocks 8, through which bolts, rivets, or like fastening devices 9 pass, said fastening devices tying the disks together and rendering the structure sufficiently rigid. Trunnions 10 are mounted in the bands 7 and provide pivotal mounting for cylindrical spring housings 11. These spring housings carry closure caps 12, said closure caps in turn having glands 13 threaded thereon, which, in conjunction with caps 12, provide packing boxes for a purpose hereinafter set forth. In addition to the trunnions 10, the housings 11 carry circular disks or plates 14, which have a bearing between the blocks 8, to further aid in strengthening the structure. Disposed within the housings 11 are helical springs 15, said springs bearing between plates or washers 16. These washers are mounted to slide freely upon the reduced portion 17' of plungers 17, the outer ends of said plungers being bifurcated at 18 to straddle a rim 19, said rim in turn supporting a tire 20. The plungers are pivoted at 21 to the rim. The housings are filled with oil or grease, and the packing boxes hereinbefore described prevent the escape of said oil or grease. The reducing of the intermediate portion of the plungers as at 17', results in the formation of shoulders $17^2$, so that as the wheel turns the spring contained within those housings at the bottom of the wheel, will be compressed away from the rim and toward the hub, while those springs at the top of the housing will be compressed away from the hub and toward the rim. It will, therefore, be seen that the plungers and springs in effect, form double acting spring spokes, which serve to support the rim portion of the wheel from the hub portion. It will further be seen that these spring spokes are mounted upon trunnions for bodily pivotal movement, by virtue of which structure the wheel, when used as a driving wheel, renders the start of the vehicle a more gradual one than would be the case if rigid spokes instead of pivoted spokes were employed, for it is apparent that any tendency of the hub to rotate with relation to the rim so that it tends to move the spring spokes out of radial alinement with the hub, is accompanied by a compression of the springs in one direction or the other, and that this in turn provides a yielding start for the vehicle.

While the elements shown and described are well adapted to serve the purposes for which they are intended, it is to be understood that the invention is not limited to the precise construction set forth, but includes within its purview, such changes as may be made within the scope of the appended claims.

Having described my invention, what I claim is:—

1. In a device of the character described, the combination with a hub, of a pair of housing disks carried by said hub, annular bearing members secured to said disks adjacent their periphery, spacing blocks located between said disks adjacent their periphery, a plurality of tubular housing members, disks secured thereto, and bearing between said blocks, trunnions carried by said housing members, and having pivotal mounting in said annular bearing members, helical springs located in said housings, plungers passing through said housings, springs located within said housings and adapted to be compressed in both directions by the movement of the plungers through said housings, and a rim member to which the outer ends of said plungers are secured.

2. In a device of the character described, the combination with a hub, of a pair of housing disks carried by said hub, annular bearing members secured to said disks adjacent their periphery, spacing blocks located between said disks adjacent their periphery, a plurality of tubular housing members, disks secured thereto, and bearing between said blocks, trunnions carried by said housing members, and having pivotal mounting in said annular bearing members, helical springs located in said housings, plungers passing through said housings, springs located within said housings and adapted to be compressed in both directions by the movement of the plungers through said housings, a rim member to which the outer ends of said plungers are secured, and packing boxes upon both ends of each of said housings.

3. In a device of the character described, the combination with a hub, of a pair of housing disks carried by said hub, bearing rings extending around said disks adjacent their periphery, said bearing rings being located upon the inner faces of said disks, blocks having their adjacent edges complementally grooved, said blocks being located and spanning the distance between said bearing rings, fastening devices traversing said blocks and said disks and tying them together, cylindrical housing members, bearing disks secured to said housing members, trunnions carried by said disks, said trunnions having pivotal mounting in said bearing rings and said bearing disks having pivotal mounting between said blocks, a rim, plungers pivoted to said rim and passing through said cylindrical housings, and springs located within said housings which resist movement of said plungers in both directions.

In testimony whereof I affix my signature in the presence of two witnesses.

MARIUS MATHIESEN.

Witnesses:
J. H. Grover,
T. M. McCarthy.

Copies of this patent may be obtained for five cents each, by addressing the "Commissioner of Patents, Washington, D. C."